United States Patent [19]

Weisbrod et al.

[11] 4,153,895
[45] May 8, 1979

[54] MARK SENSE READER

[75] Inventors: James G. Weisbrod, Dallas; John C. Eby, Jr., Bedford, both of Tex.

[73] Assignee: Recognition Equipment Incorporated, Dallas, Tex.

[21] Appl. No.: 930,106

[22] Filed: Aug. 1, 1978

[51] Int. Cl.² ............................................. G06K 9/00
[52] U.S. Cl. ........................... 340/146.3 AG; 235/456
[58] Field of Search .............. 340/146.3 AG; 235/456

[56] References Cited

U.S. PATENT DOCUMENTS

| | | | |
|---|---|---|---|
| 3,619,569 | 11/1971 | Hoehn et al. | 340/146.3 AG |
| 3,761,876 | 9/1973 | Flaherty et al. | 340/146.3 AG |
| 4,064,484 | 12/1977 | Mese et al. | 340/146.3 AG |

OTHER PUBLICATIONS

Dorr et al., "Thresholding Method for a Mark Reading System", IBM Tech. Disclosure Bulletin, vol. 15, No. 8, Jan., 1973. pp. 2595-2596.

Crawford, "Pictorial Information Disector and Analyzer System" IBM Tech. Disclosure Bulletin, vol. 15, No. 1 Jun. 1972, pp. 61-62.

Primary Examiner—Leo H. Boudreau
Attorney, Agent, or Firm—John E. Vandigriff

[57] ABSTRACT

A mark sense reader is disclosed that views each document individually to ascertain how each individual person has marked the document in regard to the density of each mark and then sets a reading threshold for that person. Each mark is scanned, divided into individual cells and a mark quality is determined. Erasures and smudges are differentiated from intended marks.

2 Claims, 14 Drawing Figures

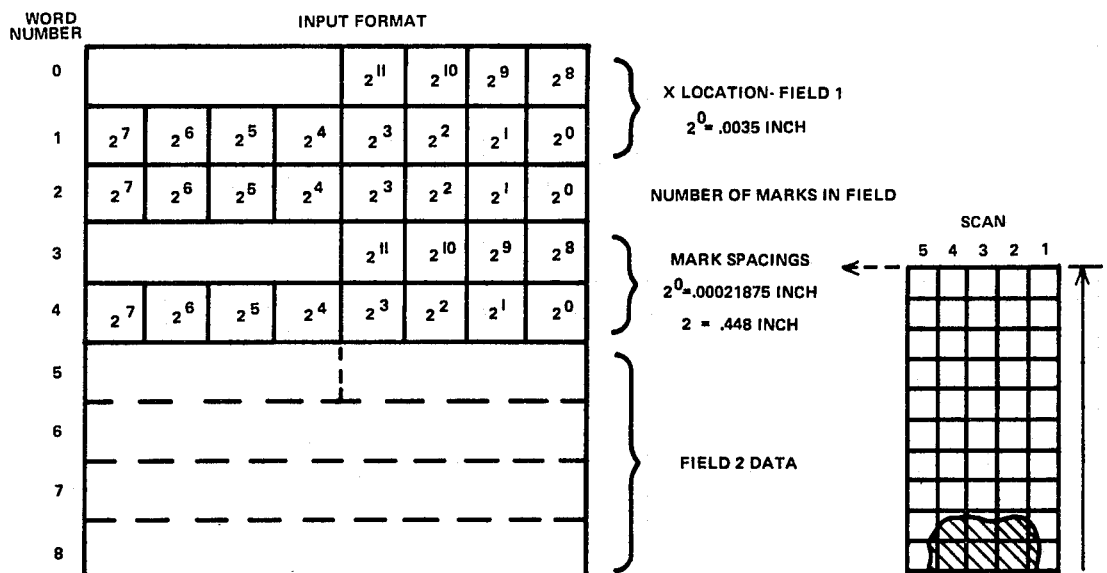
FIG. 6
FIG. 5
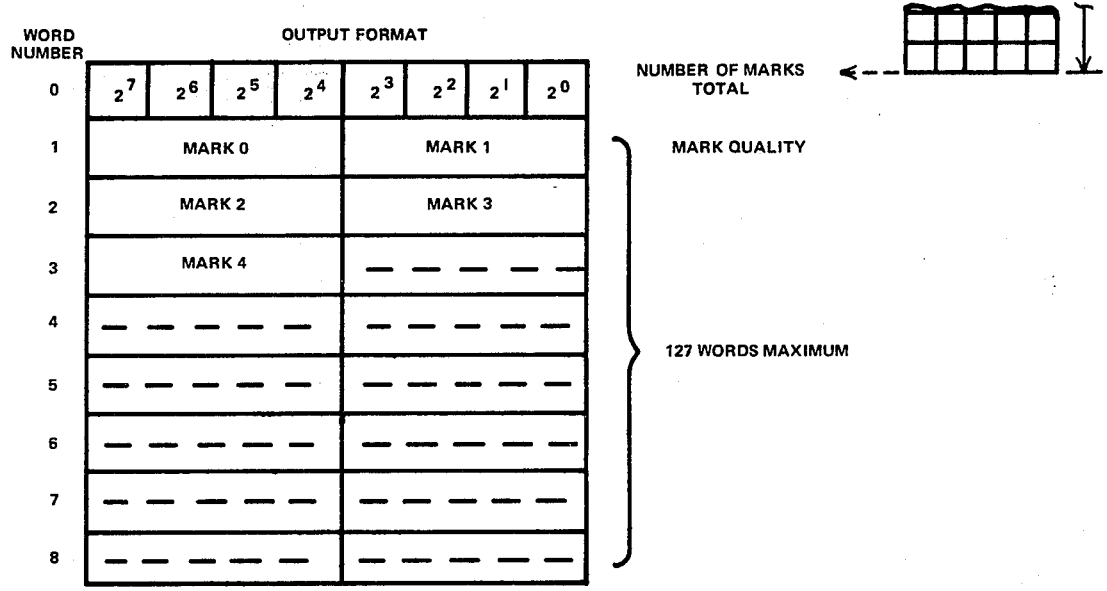
FIG. 7

MARK SENSE READER

This invention relates to mark sense readers and more particularly to a reader capable of reading an extended range of variations in mark size and intensity to distinguish between valid marks and erasures.

BACKGROUND OF THE INVENTION

The electronic scanning of documents to sense pencil marks for grading of test papers or reading lists efficiently speeds this type of reading, however the density, opacity, blackness or readability of the marks is sometimes extremely difficult due to the variance in the density of the marks and because of erasures and changes made, or the failure to completely fill in an area to be marked. One common solution for reading such variety of marks is the use of a defocused or low resolution scanning technique to determine where the target area is marked. The average amount of reflected light over the entire target area is used to determine a mark/no-mark condition. This technique allows for the generation of a quality answer for each target area based on the average reflected light over the entire target area, however, using this technique the quality answer for a thin dark mark may be the same as for a smudged erasure.

In U.S. Pat. No. 3,820,068 the background reference level is measured prior to reading and serves as a common comparative for each data channel on the document, however, the use of the background level as a standard does not take into consideration variations of marks from one document to the next.

Another solution is the use of OCR resolution scanning which in effect considers the threshold of both the size and intensity of the marks. This method does not allow for a quality answer and does not accurately process larger variations in mark size and intensity.

SUMMARY OF THE INVENTION

The present invention provides a system for mark sense reading utilizing OCR resolution scanning in which each target area is divided into a number of smaller areas or cells. The number of cells with a gray scale value greater than zero is recorded and a sum of all gray values is computed for each area. An average gray value is derived for the target area using the sum of the gray value and the number of non-zero cells. The average gray value and the number of non-zero cells is applied to a matrix to arrive at a four bit quality answer. The four bit quality answers are formatted and stored in an output memory. Once the entire page has been read a standard or threshold is set based upon the reading of each area and then a decision is made as to whether each read area contains a mark thereby distinguishing marks from erasure areas.

The quality of each mark is needed in order to determine from one page to the next a standard from which to determine if marks have been made. For example, one person filling in the target areas may use a very light mark in indicating each of the areas and the next person may use a very heavy mark to fill in the target areas, therefore from one document to the next the quality of the mark may vary. An erasure mark from one document may be just as dark as an actual mark area on another document, therefore, each document is judged upon its own merits and an average set for that document so that a variation in the marking by a particular user may be taken into consideration.

The foregoing brief description of the system as well as additional features and technical advances will be more readily understood from the following description of a preferred embodiment taken into conjunction with the accompanying drawings.

BRIEF DESCRIPTION OF THE DRAWINGS

FIG. 5 is an illustration of a mark divided into cells by the optical scanner.

FIG. 6 is an input format of the data supplied to the mark sense reader.

FIG. 7 is the output format of the data coming from the mark sense reader.

DESCRIPTION OF THE PREFERRED EMBODIMENT

Figure 1:
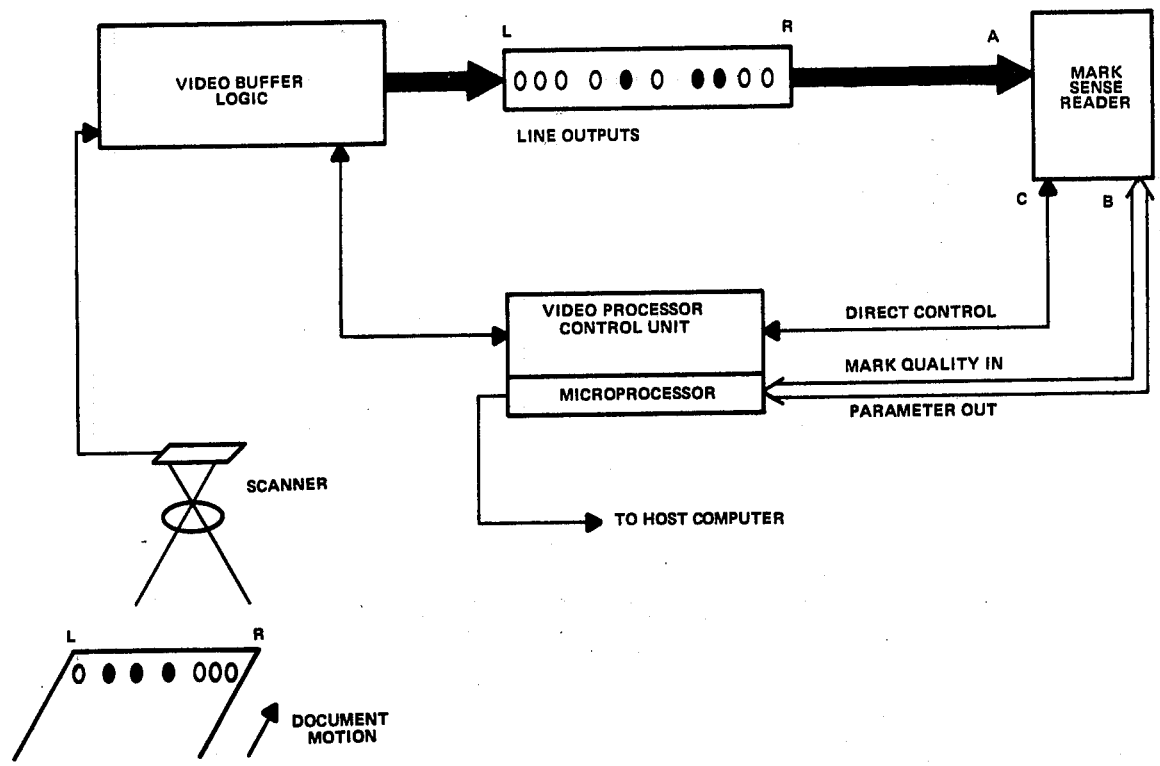
FIG. 1 is a block diagram of the basic mark sense reader shown in conjunction with a optical page reader.

Referring to FIG. 1 there is shown a block diagram of a mark sense reader (MSR) used in conjunction with an OCR page reading system. A document is moved under a scanner generating a video signal which is transferred through a video buffer to a video buffer processor control unit (VPU) and to the MSR. It should be noted that the orientation left to right (L to R) is maintained so that the video representing the right side of the document is fed into the mark sense reader at A. The mark sense reader gets direct control from the video processor control unit at C. The mark sense reader is also connected to the microprocessor at B where parameter data is supplied from the microprocessor to the mark sense reader, and mark quality is supplied from the mark sense reader to the microprocessor. The microprocessor (MPU) is connected to a host computer in which is prerecorded typical data and format information for the form being read.

Figure 1A:
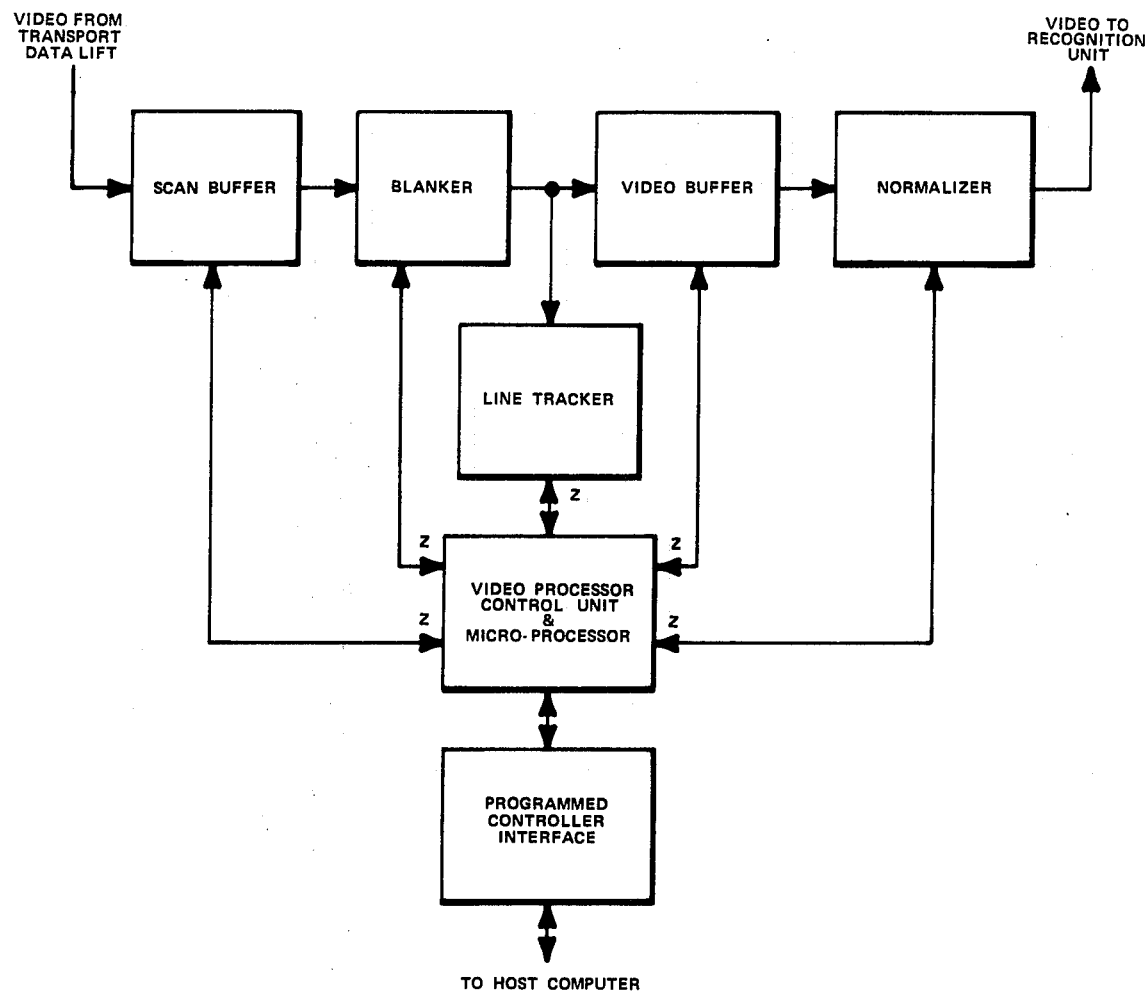
FIG. 1a is a block diagram shown a more detailed block diagram of the video buffer logic.

The video buffer logic is shown in more detail in FIG. 1a

The functions of the Video Processor Unit are summarized as follows: Accepts digital video signal from the data lift assembly electronics within the Transport; accepts control data from the programmed controller; formats the video data for use by the Recognition Unit; locates document edges and blanks video data from areas not to be read; buffers video data lifted from areas to be read; locates and tracks lines of character data; normalizes characters to a standard size; and outputs normalized character video to the Recognition Unit.

The functional operation of the Video Processor Logic Unit is best described using the block diagram of FIG. 1a as a basis for discussion. A description of each of the seven functional blocks is as follow.

The control microprocessor, consists of a Model 6800 microprocessor chip mounted on a p/c card (designated MPU), two memory boards, and an I/O bus controller consisting of four I/O bus control p/c cards. As shown, the control microprocessor interfaces with all functions of the Video Processor Unit.

The four bus controller cards are unique to the Video Processor Unit and provide an input/output interface and interrupt capability to all elements of the Video Processor Unit.

The Programmed Controller interface is a digital data interface, between the Programmed Controller and the video processor unit control microprocessor. The interface provides the following data communications between the Programmed Controller and the microprocessor; video processor control data; and document type selection. Page format data for each document type includes: beginning and ending vertical (Y) addresses for lines to be read; line format for each line type including beginning and ending, horizontal (X) addresses for data to be read or blanked; line spacing, and normalization ratio; top of document data; new read area encountered; end of line data; and bottom of document data.

The scan buffer is a static, bipolar, semiconductor memory buffer which accepts and buffers a single horizontal scan of video output data from the data lift assembly in the transport. The scan buffer accepts the 4-bit outputs of the four a/d converter circuits, formats the data into a single scan line, and buffers the data for output to the blanker logic. The scan buffer may be controlled by the microprocessor during diagnostic operation.

The blanker logic is used to blank video from areas on a document which are not to be read. The blanker is controlled by the control microprocessor and may allow all, none, or selected portions of the data in the scan buffer to be transferred to the line tracker and/or video buffer logic. The control microprocessor sends the blanker logic the X and Y coordinates of the document edges, document skew, and the X and Y coordinates of the areas to be blanked. The blanker corrects all X and Y coordinates for document skew and performs the blanking function.

The line tracker logic accepts the video output of the blanker and determines line tops and bottoms. The Y coordinates of the line tops and bottoms are measured and this coordinate data is transmitted to the control microprocessor. The control microprocessor uses the line top and bottom coordinate data to control unloading of data from the video buffer logic.

The video buffer logic is a dynamic, MOS memory buffer which accepts and buffers a complete line of 4-bit video output data from the blanker logic. The primary purpose of this area buffer is to convert the video data from the horizontal scan (produced by the data lift) to the vertical scan required by the Recognition Unit. The width and height of the buffer is adequate to contain a minimum of one complete, nine-inch wide line of 0.112 inch high character data including line skew. Each video buffer is also capable of optional expansion to accommodate a 12-inch wide line of data.

Data is input to the buffer on a row basis and is output to the normalizer logic on a column basis. The data output to the normalizer logic is controlled by the control microprocessor to compensate for any line skew which may be present. The microprocessor utilizes data from the line tracker to compute a movable scan window. The scan window data is used by the video buffer to deskew the line and ensure the data for a single line is output to the normalizer.

The normalizer logic accepts the 4-bit video outputs of the video buffer, electronically reduces the data to a standard character size and outputs the data to the system Recognition Unit(s).

The purpose of the normalizer is to adjust for varying character sizes on the document. The normalizer is capable of reduction ratios ranging from 2:1 to 1:1 in increments of ⅛.

The normalizer is controlled by the video processor unit control microprocessor. Control data is based on document format data from the System Programmed Controller.

Figure 2:
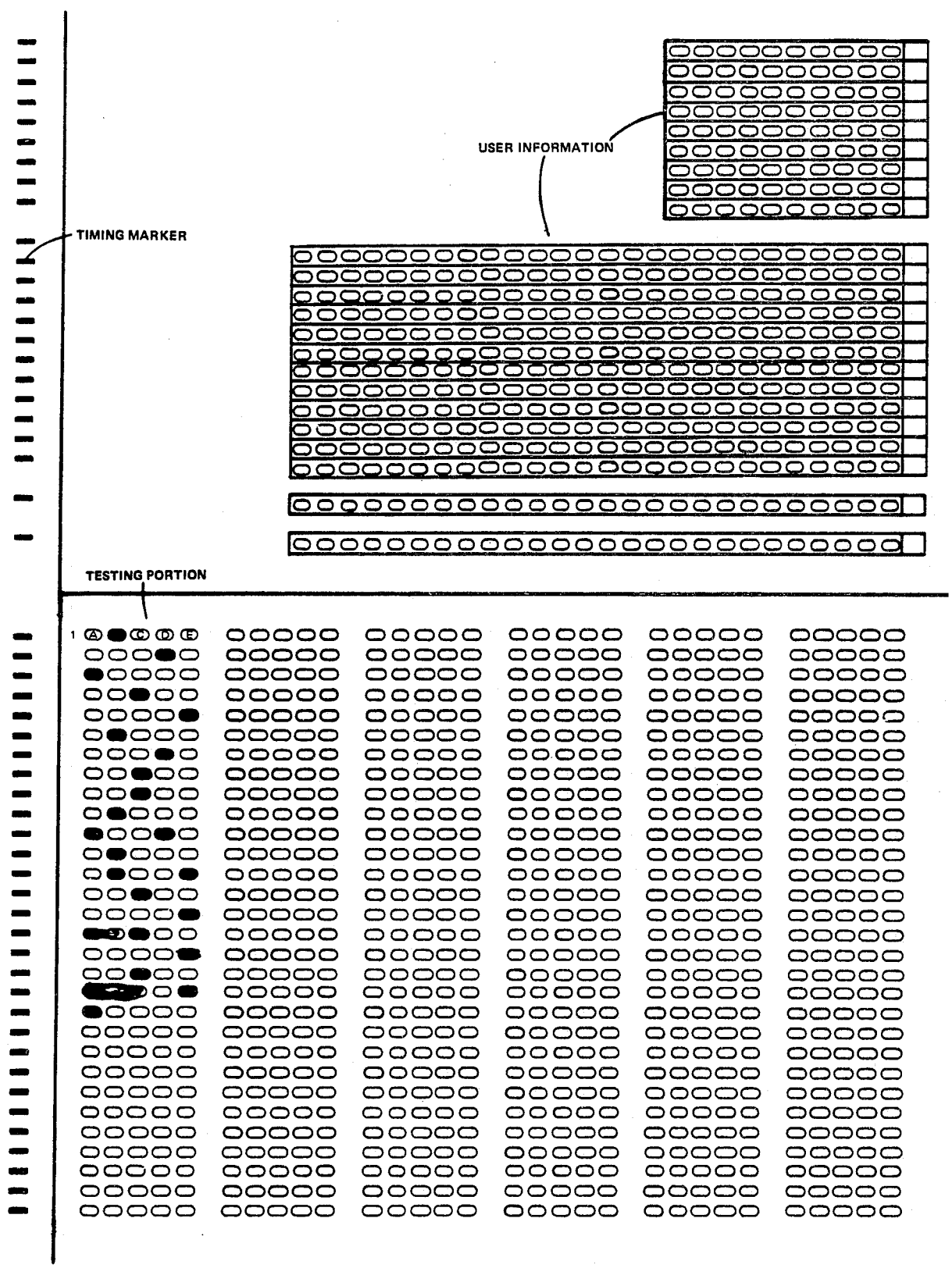
FIG. 2 is an illustration of an example of a page used in conjunction with the reader showing a typical format for mark sense reading.

A typical form is shown in FIG. 2. In this form, for example, the top information may be used to identify the user, the type of test or information being recorded. The individual columns on the bottom half of the form are used to indicate a selection, for example, an answer in a quiz.

Figure 3:
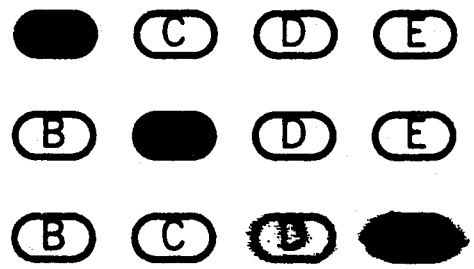
FIG. 3 illustrates target areas marked with varying indensities and showing an erasure.

Question one is to be answered by indicating the true answer to be one of A, B, C, D or E. In marking answers, different persons may mark as shown in FIG. 3, for example, one person may completely obliterate the target and make it a dense black as shown in the B of the first column in FIG. 3. Another person may barely mark the area with a very light gray in which the letter still will appear, or a third person may heavily mark the target area but not completely blacking out the letter. The mark may be made and then changed by erasing. Because soft lead pencils are normally used in marking such forms, the erasure may form a smudge which may in some instances, may be blacker or heavier than a lightly marked target area.

Figure 4:
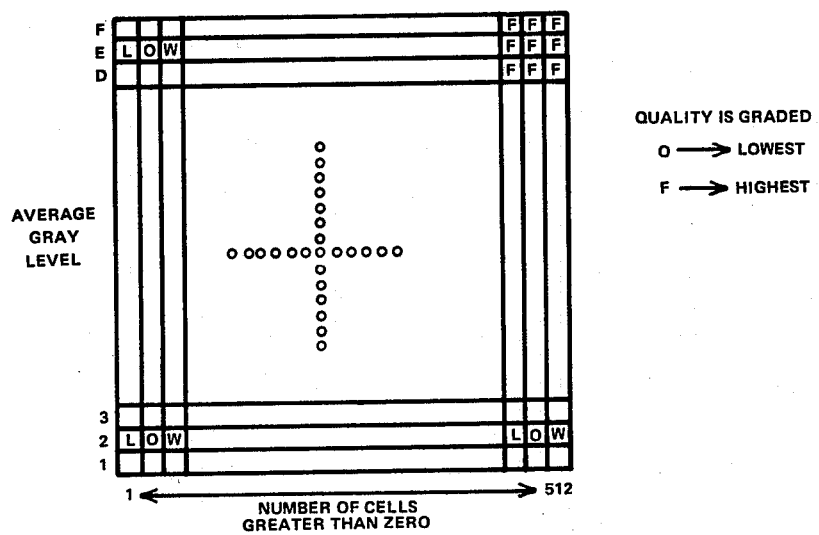
FIG. 4 is an example of a grid which supplies the means of interpreting the quality of the mark sense target items in terms of intensity and mark size of mark.

FIG. 4 illustrates the means which is used within the invention to evaluate a mark. Each target area is divided into a number of cells for example, a 3.5 mils by 7.0 mil area. The number of cells with a gray value greater than zero is recorded and a sum of all gray values greater than zero is computed. An average gray value is derived with the target using the sum of the gray cells and the number of cells used in the sum. The average value and the number of cells is then applied to a 15×15 matrix to arrive at a four bit mark quality answer. Unmarked targets are signed zero quality. The 15×15 grid supplies a means interpreting the quality of the marked target in terms of the intensity and size of the mark. Since all marked targets receive a quality answer, a user program can better determine if one is valid, another is an erasure, or if both are valid and therefore a double marked field exists. As illustrated in FIG. 4, the upper right corner is the highest quality whereas the lowest of the four corners indicate low quality marks. The matrix provides background filtering and a non-linear means in interpreting the quality of a mark in terms of the intensity and the size of the mark. Each target is assigned a value, the range of these values is from 0 for unmarked targets to the F for the highest quality marks.

As seen in FIG. 5 each target is scanned by a single column scanning array 48 cells high. Each successive scan divides a mark into cells some of which will be completely white, some of them will fall completely within target and will be dark, and some will be part target and part background. Therefore, based upon the average density of the value of the cells scanning a mark, a quality is assigned to the reading of that mark.

The data transferred from the MSR to the VPU and MPU are shown in FIGS. 6 and 7. All data transfers are in the format specified in these figures. Line format data (parameter) must be input in one, five to one hundred twenty-five word, transfer formatted per input format. The line format may change on a line to line basis. The line format data needs to be transferred to the MSR only when a change in line format is required. The line format data is stored in the parameter memory to be discussed later.

The MSR receives signals from the VPU allowing the MSR to locate the mark locations specified by the line format data. The MSR also receives information from the VPU normalizer and uses the begin scan to generate the read envelope of each mark location. The MSR also uses the four bit gray video to determine the quality and average gray level of non-zero cells within the read envelope.

The quality and average gray level of non-zero cells in the read envelope is used to generate a four bit quality factor for each mark. These four bit quality factors are formatted and stored in the output memory for the output to the MPU. The MSR has internal control that allows it to track separate fields and to set up the next field. At the completion of the last specified field the MSR will terminate operation and set up for an output the MPU. The MSR termination is also exercised when a fault condition occurs. The two fault conditions that occur are when the next location to be found is of a lesser value than the current location and when the normalizer goes inactive prior to the MSR finding the last specified mark location. These fault conditions do not set up a flag and the only indication that they exist is the total mark count sent to the MPU does not equal to the expected mark count.

Figure 8:
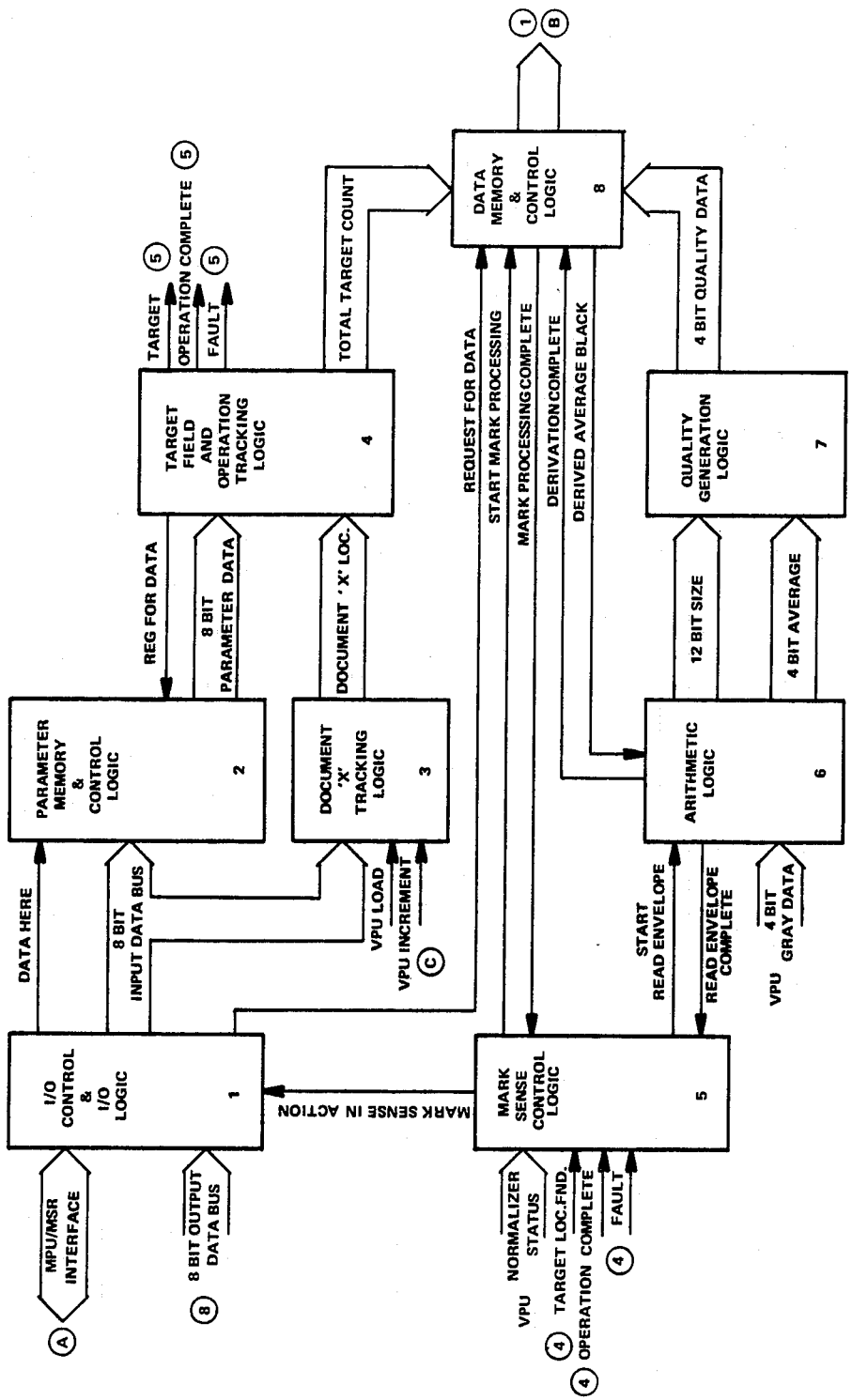
FIG. 8 is a block diagram of the mark sense reader.

A more detailed functional block of the MSR is shown in FIG. 8. In FIG. 8 the points A, B, C correspond to the point A B C in FIG. 1 showing how the mark sense reader is interconnected with the overall system. In FIG. 1 and in FIGS. 9 through 12 each block is labeled and the data flow in and out of the blocks is labeled to indicate to which block that particular line is connected for example, the Input/Output Control and Input/Output Logic block 1 has a 8 bit output data bus connected thereto and that data comes from block 8.

The Input/Output Control and Input/Output Logic block 1 decodes a command from the MPU and processes all the data transferred between the MPU and the MSR. Data transferred between the MPU and the MSR may take place only when the Mark Sense Control (MSC) has gone inactive and given control to the I/O control.

During an input to the MSR from the MPU the I/O control controls primary memory addressing and writes the input data into the parameter memory. During an output from the MSR to MPU, the I/O control controls the output memory addressing and gates the contents of output memory onto the MPU data bus.

The parameter memory and Control Logic block 2 includes an 8×128 memory used to store the line format (parameter) data. The control logic associated with the parameter memory allows for the addressing of the memory and writing into memory when controlled by the I/O control. When the field tracking logic requests data from the parameter memory the control logic accesses memory and stores its contents in the appropriate parameter register.

The document "X" Tracking Logic circuit block 3 contains two registers. The first being the "$(X_R\text{-}X$ START)" register which is loaded by the MPU with the number of increments that the scan buffer was started before or after the document edge was detected. The document is divided into increments to indicate each reading interval, for example, in FIG. 2 the dark marks along the side of the form are timing marks and each mark corresponds with the line of target areas to be scanned. The timing marks may be, for example, 0.014 to 0.035 inch thick and 0.05 to 0.225 inch long. The timing marks specification may depend upon the equipment in which the mark sense reader is used. The targets are normally printed in a blind ink, blind to the extent that the reader does not read the target itself but only the black marking within the target area.

The second register is the document "X" location register and contains in effect the sum of the first register and the number of set increments the scan buffer has issued to generate "X" locations with reference to the detected document edge.

The Mark, Field, and Operation Tracking block 4 contains the "X" location register 24, first "X" location register 21 and a mark pitch register 22. The latter two are parameter registers loaded by the parameter memory control 17. Each time a new field is started, the contents of the first "X" location register are loaded with the "X" location register. At such time as the contents of the "X" location register is equal to the document "X" location, a mark location found is generated. At this time the contents of the "X" location register is summed with the contents of the mark pitch register and the sum loaded into the "X" location register. Fault is raised when the document "X" location register is greater than the "X" location register. The field tracking section contains a mark in field register 34 (a parameter register), a field mark counter 33, a total mark counter 34, and a comparator. Each time a mark location found is generated, the mark counters are incremented, the marks in field register's contents is compared with the contents of the field mark counter. When the two compare, field complete is sent to operation tracking a request for operation tracking data is sent to the Parameter Memory Control 19 and the marks in field counter is reset.

Operation tracking consists of an operation register which contains the address of the last word of parameter data in parameter memory and a comparator. This comparator compares the current parameter memory address to the contents of the operation register. When the parameter memory address is equal to or greater than the contents of the operation register, operation complete set is raised signifying that the last field is now being processed. When the next field complete occurs Operation Completion is set and sent to the Mark Sense Controller Block 5. The mark sense control (Block 5) serves as a master control, starting or controlling most of the other controllers. This control logic does most of the general "housekeeping". Upon receiving mark location found from the mark tracking logic, the Mark Sense Controller uses the arithmetic logic 42 to generate a read envelope and to accumulate the data needed for quality generation. When the Mark Sense Controller receives a read envelope complete signal from the arithmetic unit it issues a start mark processing signal to the data memory control logic and relinquishes control of the arithmetic logic to the data memory controller. When the Mark Sense Controller receives either a fault signal, or normalizer inactive, or operation complete it instructs the data memory control to terminate. When the data memory control has terminated, the Mark Sense Controller will go inactive and give control to the I/O controller. The Mark Sense Controller will again go active when the normalizer goes active. The arithmetic logic unit 6 contains two counters, one to count the number of nonzero cells found in the read envelope, the other counter is used to count scans to generate the read envelope, and to count the number of times the cell counter can be subtracted from the gray sum to derive an average gray value. An adder with multiplexed inputs and a register are used to accumulate a sum of all of the cells in a read envelope. This adder and the register is used in conjunction with the scan counter and a comparator for average gray level derivation. A four bit gray data port interfaces to the VPU normalizer to receive cell data.

The Quality Generator Logic unit 7 consists of two 4×256 PROMs. One is used for the non-linear truncation of the non-zero cell count and the other is used to provide a 16×16 matrix using the truncated cell count and the average gray level to assign a non-linear quality answer.

The data memory in Control Logic unit 8 is an 8×128 bit memory. This section of logic also provides memory addressing, data formatting and writes the data into the memory. The data memory control logic also controls the arithmetic unit during the non-read envelope time to derive the average gray level of the previous read envelope. When the derivation is complete, the quality data is available to and stored in a format section. Each time an 8 bit word has been assembled in the format section, it is written into memory. When the data memory controller receives a terminate signal from the Mark Sense Controller, it writes the contents of the format section into memory, updates the memory address, writes the total mark count into location zero, and acknowledges that termination is complete. I/O control may access data in the data memory.

FIGS. 9 through 12 are more detailed block diagrams of the block diagram of FIG. 8. While the various parts of FIGS. 9 through 12 have been mentioned it is felt that further description may be needed in order to adequately describe the embodiment shown in FIG. 8.

Figure 9:
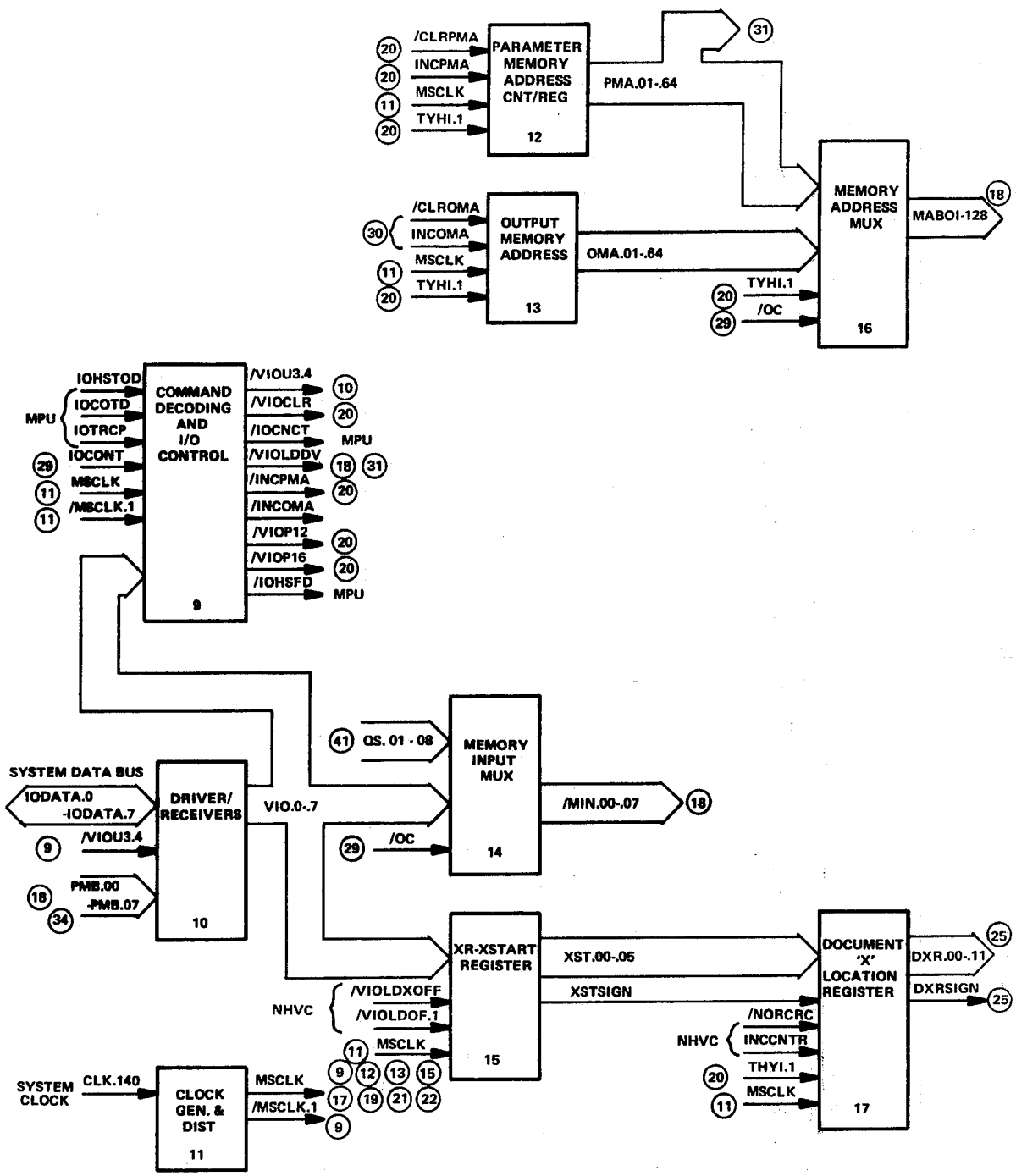
FIG. 9, 10, 11 and 12 are more detailed block diagrams of the system shown in FIG. 8.

FIG. 9 includes the Command Decoding and I/O Control block 9. This section of logic decodes a command from the MPU and possesses all data transfers between the MPU and the MSR. Data transfer between the MPU and MSR may only take place when the MSC has gone inactive and given control to the I/O control. During an input to the MSR from the MPU, the I/O control controls the parameter memory addressing and writes input data to the parameter memory. During an output from the MSR to the MPU, the I/O Control controls the output memory addressing and gates the contents of the output memory to the VPU data bus. The data/receivers 10 connect the MSR to the VPU data bus.

The Clock Generation and Distribution 11 receives the system clock from the VPU and regenerates the clock and distrubutes the clocks to the various other circuits requiring the clock pulse.

The Parameter Memory Address Counter/Register 12 is a 7 bit counter that is used as a memory address register for the parameter section of the parameter/output memory.

Output Memory Register Counter/Register 13 is a 7 bit counter that is used as a memory address register for the output section of the Parameter/output memory.

Memory Address Multiplexer 16 allows either the parameter section of the output section of the parameter/output memory to be addressed by its associated address register. The output of the memory address multiplexer goes to the parameter and Output Memory 18 shown in FIG. 10.

The Memory Input Multiplexer 14 is used in conjunction with the memory address multiplexer and allows either parameter data from the receivers to be written into the parameter section of memory or output data from the output storage to be written into the output section of the memory. Its output goes to the parameter and output memory 18.

The XR-XSTART register 15 is loaded with the number of increments that the scan buffer is started before or after a document edge is detected.

The Document X Location Register 17 sums the contents of the XR-X Start Register with the number of scans the scan buffer has issued to generate X locations with reference to the detected document edge. Output from this register is supplied to the Location Finder circuit 25 on FIG. 10.

Figure 10:
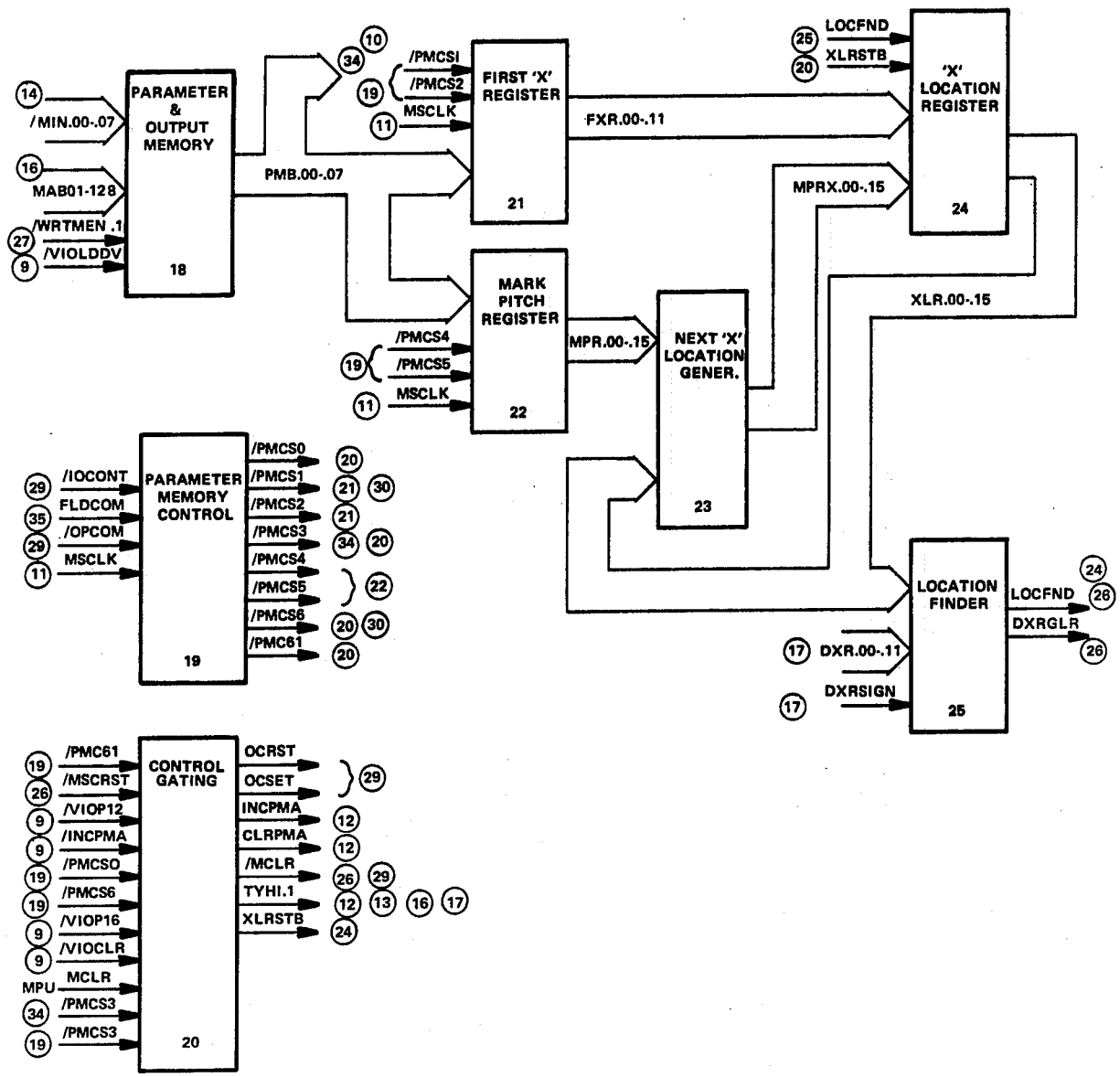

Looking at FIG. 10, the parameter/output memory 18 is an 8×256 bit memory Words 0 –127 are used to store parameter data and words b 128 to 255 are used to store output data.

The parameter Memory Control 19 accesses the parameter section of the parameter/Output Memory 18 and loads a portion of its contents into the appropriate parameter register at the beginning of each line and when the last mark location in each field has been found.

Control gating block 20 FIG. 10 is a collection of standard logic gates used for signal gating and control signal generation.

The First X Register 21 is loaded by the parameter memory control 19 with the "X" location of the first mark in a field.

The Mark Pitch Register 22 is loaded by parameter memory control with the spacing between marks.

The Next "X" Location Generator 23 controls circuitry which sums the current "X" location with the contents of the mark pitch register. This sum is the next "X" location to be found and is loaded into the "X" Location Register 24. The "X" location register contains the "X" location to be found and may be loaded from the next "X" location generation or from the first "X" register.

The Location Finder 25 contains logic circuitry which compares the "X" location register to the document "X" register. The location found is generated when the registers are equal. A document "X" greater than location "X" signal is generated when the condition exists and this condition is considered a fault.

Figure 11:
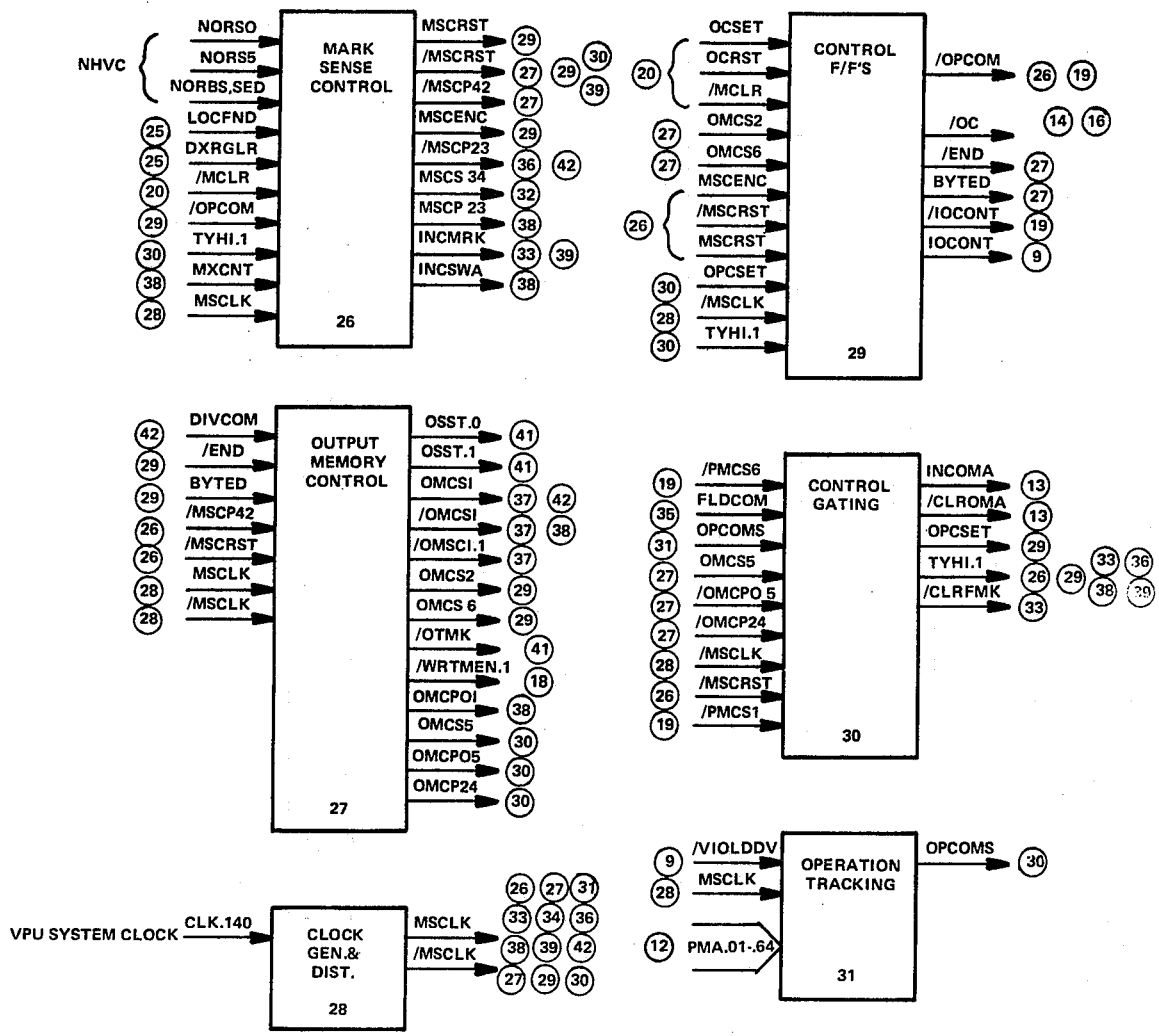
Figure 12:
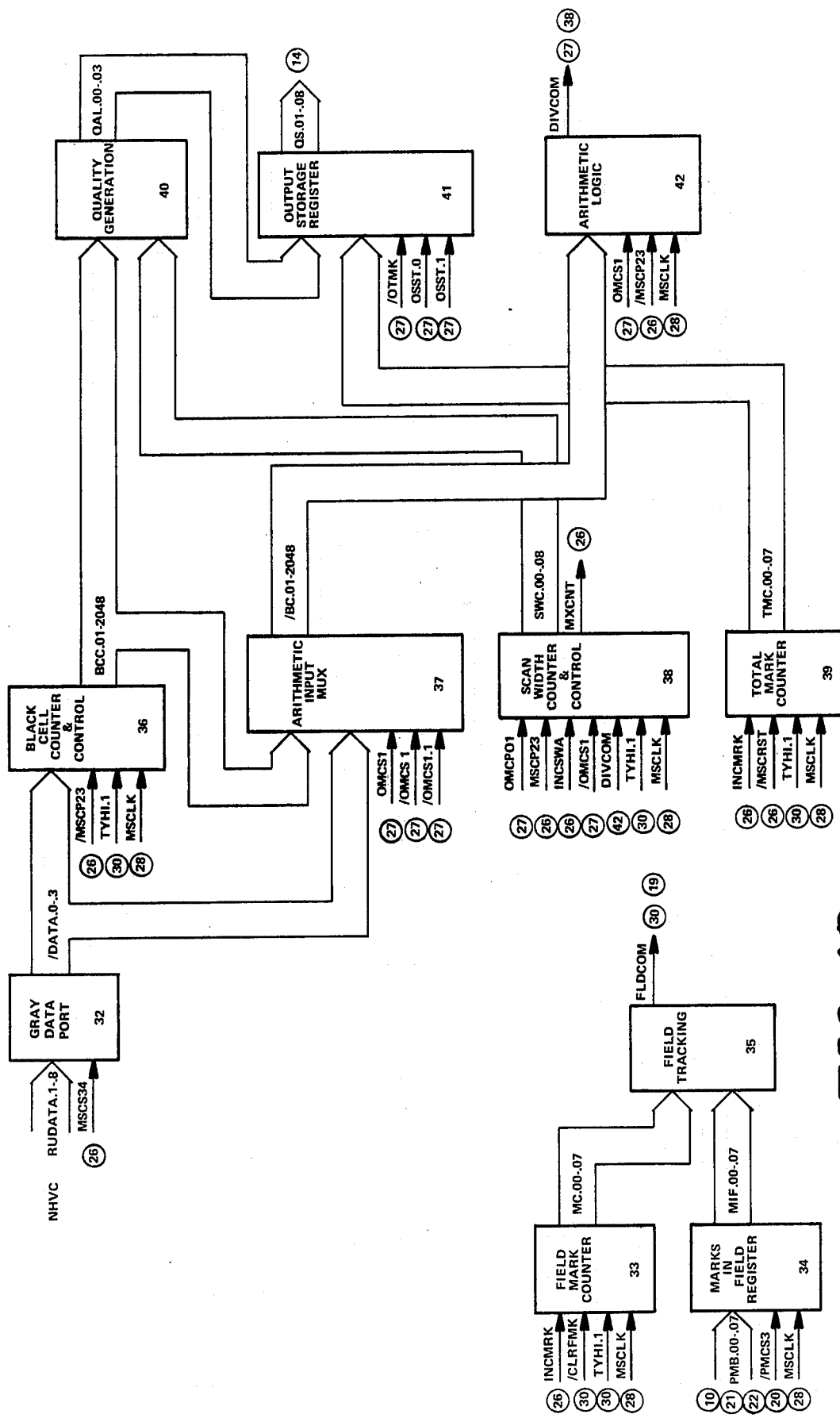

Referring to FIG. 11 the Mark Sense Control 26 serves as a master controller starting or activating most of the other controllers. It also does most of the general "housekeeping", controls the read envelopes, collects the data necessary for quality generation, and initiates and terminates the mark processing.

Output Memory Control (OMC) 27 is started by the Mark Sense Control at the trailing edge of each read envelope. It controls the arithmetic logic, scan width counter, and quality generation during this time and derives a four bit quality factor which it loads into the appropriate area "output storage". When two four bit quality factors have been assembled in the output storage, the output memory control updates the output memory address and writes the contents of the output storage into output memory. When processing is terminated by the mark sense control, the output memory controls again start. At this time the "OMC" updates the output memory address, writes the contents of output storage to the output memory, loads the contents of the total mark counter into output storage, resets the output memory address to the first location of output memory, and writes the total mark count into the output memory. After the total mark count has been written into the output memory the "OMC" allows the I/O control to access memory.

Control Flip-Flops 29 are general control flip-flops used for multiplexing and control steering. They are set and reset by various controllers as indicated by the inputs thereto.

Clock Generation Distribution 28 receives the VPU clock system and regenerates the clock and distributes the clock pulses to the various circuit as indicated by the outputs of block 28.

Control gating block 30 is a collection of standard logic gates used for signal gating and control signal generation.

Operation Tracking Logic 31 compares the total words of parameters loaded to the words that have been retrieved to determine when operations have been completed.

The Gray Data Port 32 is controlled by the mark sense controller and receives and re-sync's four bit gray video from the VPU normalizer.

The Arithmatic Input Multiplexer 31 controls input to the arithmatic logic.

Quality Generation Circuit 40 consists of two 4×257 PROMS using the number of non-zero cells in the average gray level of non-zero cells contained in a read envelope to assign a four bit quality factor to each read envelope.

Output Storage Register 41 is used to assemble all data to be written into the output memory.

Arithmetic Logic 42 sums all of the cell values during read envelopes. Between read envelopes, the arithmetic logic and scan width counter are controlled by the output memory control. Using the output from the black cell counter, a series of subtractions are performed and the average gray level of the non-zero cells contained in a read envelope is present in the scan counter at completion of the subtractions.

Scan Width Counter Control 38 performs two functions, one of them being tracking read envelope width, and the other being use in deriving the average gray level.

The Total Mark Counter 39 contains a total number of mark locations found on a line prior to operation termination.

Field Mark Counter 33 contains a total number of mark locations found in the current field.

Marks in field register 34 is a parameter register containing the number of marks to be found in the current field.

Field Tracking Circuit 35 contains logic which compares the contents of the field mark counter with the contents of the marks in field register to determine when the specific field has been completed.

Black cell counter and control block 36 is a twelve bit counter that counts the total number of non-zero cells within a target area. Control allows the counting of only non-zero cells and resets the counter after quality generation is complete.

Figure 13:
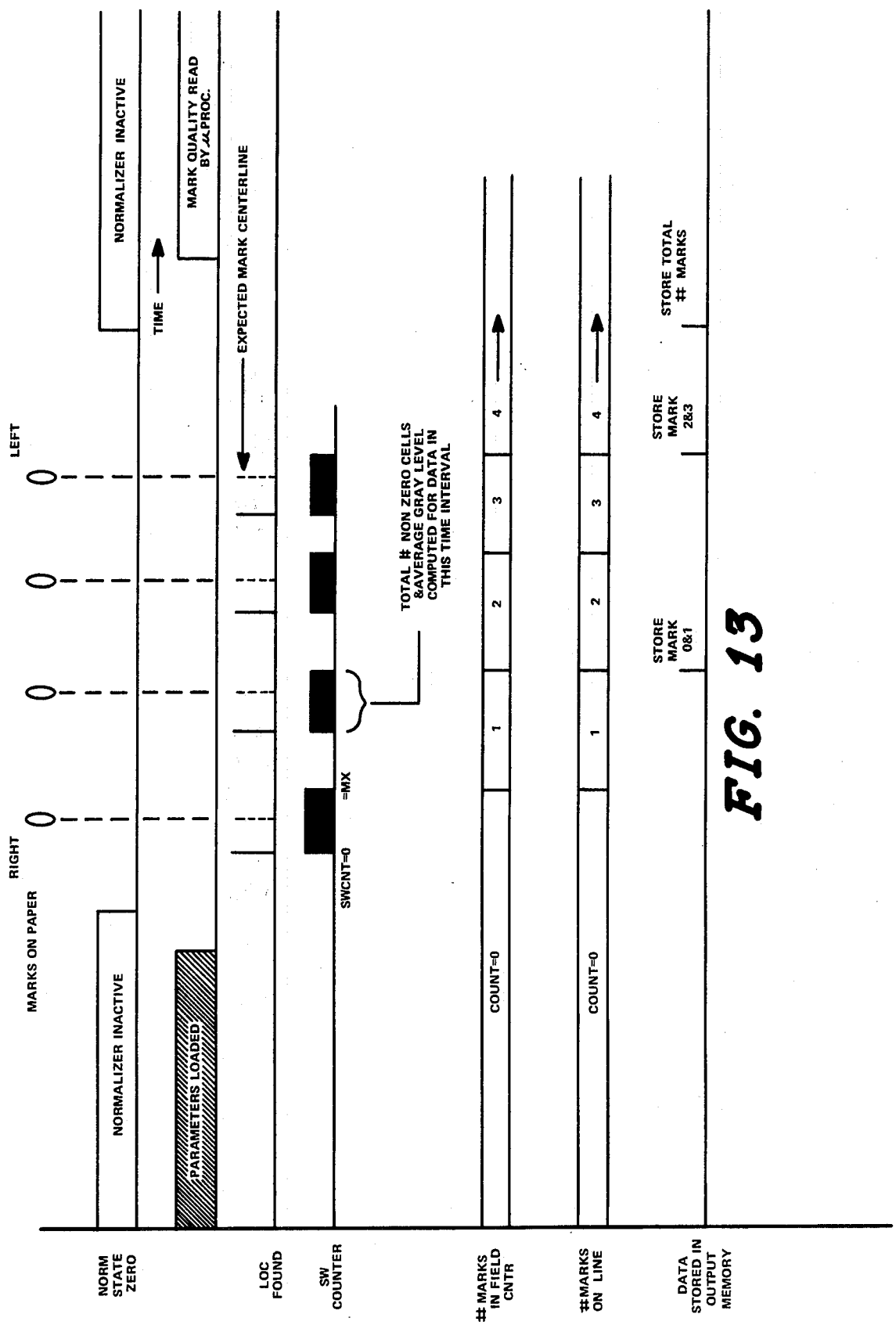
FIG. 13 is a timing diagram for the mark sense system.

FIG. 13 is a timing diagram of the operations of the mark sense reader indicating that the normalizer is active during the actual reading of the marks on the paper, that the parameters are loaded in prior to the reading during the intervals indicated, which are approximately equal distance on each side of the expected mark center line.

In FIGS. 8 through 12 the input and outputs of each of the blocks are marked by abbreviations referencing what the input is and the number indicates to which of the other blocks the input or output is connected. In order to understand the interconnection between the blocks the following definitions and explanations of the interconnections between the blocks is given.

IOHSTD — Handshake to device — an acknowledgement from the VPU—microprocessor signifying the receipt of data.

IOCDTD — Command data to device — a notification from the VPU—microprocessor that command data is being transferred.

IOTRCP — Transfer Complete — an acknowledgment from the VPU—microprocessor signifying that the data transfer is complete VIOV3.4 — Unit Three Bit Four Command Decode — Unit three bit four decode places the mark sense I/O in an output mode.

VIOLCR — Load Command Register — load the command register with command data from the VPU-microprocessor.

IOCNCT — Unit Connect — a signal sent to the VPU-microprocessor acknowledging that the mark sense reader is ready.

IOHSFD — Handshake from Device — an acknowledgment from the mark sense reader to the VPU-microprocessor signifying the receipt of data.

VIOLDDV — Load Device — signal used to store parameter data sent from the VPU-microprocessor in the mark sense reader's parameter memory.

INCPMA — Increment Parameter Memory Address.

INCOMA — Increment Output Memory Address.

VIOP12 — Path One to Two of the I/O Controller — this signal is used to set the memory control logic in the input mode.

VIOP16 — Path One to Six of the I/O Controller — this signal is used to set the memory control logic in the output mode.

IODATA.0-.7 — Eight Bit Bidirectional Data Bus — used for all data transferred between the VPU-microprocessor and a device.

VIO.0-.7 — Eight Bit Data Bus — used internal to the mark sense reader to present data, received from the VPU-microprocessor to the memory input multiplexer and various registers.

MSCLK — Mark Sense Clock

/MSCLK-.1 — Mark Sense Clock — inverted

PMA.01-.64 — Seven Bit Parameter Memory Address — used to address locations in the parameter section of memory via the memory address multiplexer.

OMA.01-.64 — Seven Bit Output Memory Address — used to address a location in the output section of memory via the memory address multiplexer.

MAB.01-.128 — Eight Bit Memory Address — these signals are generated by selecting either the parameter memory address or the output memory address. These eight bits are used to address the memory — MAB.128 is always set when the output memory address is selected.

/MIN.00-.07 — Eight Bit Memory Input Bus — Data to be stored in the memory is selected by the memory input multiplexer and presented to the input to the memory via this eight bit bus.

XST.00-.09 — "X" Start Count (10 Bits) — a numeric value representing the number of scans that the normalizer wnet active prior to or after the document edge was detected.

XSTSIGN — "X" Start Sign (One Bit) — the sign bit signifies whether the normalizer went active prior to or after the document edge was detected. When the sign is negative the normalizer went active prior to document edge detection.

/VIOLDXOFF — Load "X" Offset — this signal loads the eight low order "X" start bits into the XR-XSTART register.

/VIOLDXOF.1 — Load "X" Offset .1 — this signal the two high order "X" start bits and the sign bit into the XR-XSTART register.

/NORCRC — Normalizer Clear or Reset Counter — this signal loads the contents of the XR-XSTART register into the document "X" location register at the beginning of each data line.

INCCNTR — Increment Counter — this signal increments the document "X" location register every scan.

DXR.00-.11 — Document "X" Register Outputs (12 Bits) — contains current document "X" location.

DXRSIGN — Document "X" Register Sign — (1 bit)

PMB.00-.007 — Parameter Memory Output Bit (Eight Bits) — contains the contents of the memory location currently being addressed.

/PMCS0 — Parameter Memory Controller State Zero — state zero is an inactive state.

/PMCS1 — Parameter Memory Controller State One — state one loads the least significant eight bits of the first "X" register and increments the parameter memory address register.

/PMCS2 — Parameter Memory Controller State Two — state two loads the four high order bits of the first "X" register and increments the parameter memory address register.

/PMCS3 — Parameter Memory Controller State Three — state three loads the "X" location register with the contents of the first "X" register, loads the marks in field register and increments the parameter memory address register.

/PMCS4 — Parameter Memory Controller State Four — state four loads the low order eight bits of the mark pitch register and increments the parameter memory address register.

/PMCS5 — Parameter Memory Controller State Five — state five loads the eight high order bits of the mark pitch register and increments the parameter memory address counter.

/PMCS6 — Parameter Memory Controller State Six — state six is a test state. State six sets the output control flip-flop. State six and field complete and operation complete sets the operation complete flip-flop.

/PMC61 — Parameter Memory Control Path Six to One — path six to clears the marks in field counter and resets the output control flip-flop.

OCRST — Output Control Flip-Flop Reset —

OCSET — Output Control Flip-Flop Set —

INCPMA — Increment Parameter Memory Address Register —

CLRPMA — Clear Parameter Memory Address Register —

/MCLR — Master Clear —

TYHI.1 — Tie High — logic one

XLRSTB — "X" Location Register Strobe —

FXR.00-.11 — First "X" Register Outputs (12 Bits) — contains the "X" position of the first target position in the next field.

MPR.00-.15 — Mark Pitch Register Outputs (15 Bits) — contains the number of "X" positions between target locations.

MPRX.00-.15 — Mark Pitch Register Plus "X" Output (16 Bits) — contains the sum of the mark pitch register and the "X" location register.

XLR.00-.15 — "X" Location Register Outputs (16 Bits) — contains the "X" position of the next target area.

LOCFND — Location Found — this signal goes high when the document "X" is equal to the "X" location of the target area and starts the processing of that target area.

DXRGLR — Document "X" Register Greater Than "X" Location Register — an error condition causing termination of processing.

NORS0 — The VPU normalizer is inactive and is waiting to output the next line.

NORS5 — The VPU is active and is currently outputting a line to the Recognition units.

NORBS.SED — This signal occurs for one clock period at the beginning of each vertical scan of data which is sent from the normalizer logic (part of VPU unit).

MSCRST — Resets mark sense logic to initial state

/MSCRST

/MSCP42 — Path 4 to 2 of the mark sense control logic. In state 2 the controller looks for the signal LOCFND and then begins to process another work in status 3 and 4.

MSCEND — This signal sets the end flip-flop to indicate processing is complete for the line.

MSCP23 — Path 2–3 — indicates that the mark location is found and mark processing is to being.

/MSCP23

MSCS34 — State 3 or State 4 loads 4 bit gray data into input register.

INCMRK — Increments the total mark and works in field counters.

INCSWA — Increments scan width counter (this count tracks the target area width).

OSST.0 — Stores the upper byte of the output data into the output data memory.

OSST.2 — Stores the lower byte of the output data into the output data memory.

OMCS1.1 — In state one the controller successively subtracts the cell count from the total gray count to create an average gray value for the mark.

OMCS1

/OMCS1

OMCS2 — In state 2 the output controller selects the upper or lower byte of the output data word for writing into the output memory.

OMCS6 — Writer output register to output memory. Resets "END" FF and enables I/O controller to transfer data to processor.

/OTMK — Loads total marks processed into output register.

/WRTMEM.1 — Written output register to output memory.

OMCP01 — Path 0-1 — starts arithmetic processing — clear scan width counter.

OMCS5 — Writes output register to memory — clears output memory address, loads total mark counter into output register.

OMCP05 — Indicates that the last field has been processed and the total marks is to be entered into the output memory.

OMCP24 — Writes output register to output memory.

/OPCOM — Indicates that the total number of marks for the line have been processed.

OC — Output Control FF — this FF is used to indicate whether the output memory controller or the parameter memory controller is accessing the memory.

/OC

/END — Indicates that the total number mark have been processed for the line.

BYTE0 — Indicates that the upper four bits is to be loaded into the output register.

/IOCONT — Indicates that the MPU can read or write data to the memory. (Parameter and data memory)

IOCNT

INCOMA — Increment output memory address.

/CLROMA — Clear output memory address counter.

OPCSET — Sets operator complete FF.

/CLRFMK — Clears field mark counter.

OPCOMS — Indicates that all parameter data has been extracted from the parameter memory.

/DATA.0-.3 — Four bit gray scale data from normalizer.

MC.00-.07 — Accumulative count of number marks processed in current field.

MIF.00-.07 — Number marks to be processed in current field.

FLDCOM — Indicates that the number marks preocessed=total number mark in current field.

BCC.01-2048 — Accumulative count over the scan width period of the total number of non zero gray scale data points.

/BC.01-2048 — Data path which is either the total number black cell count or the current gray scale value.

SWC.00-.08 — Scan count indicating the target area read width is set to zero at each LOCFND period.

MXCNT — Indicates the end of a target area.

TMC.00-.07 — Indicates total number marks on the line.

QAL.00— Four bit quality answer for each mark.

OS.01-.08 — The eight bit word which is to be written to the output memory.

DIVCOM — Indicates that the result of subtracting the black cell count from the total gray cell accumulates value is negative.

Having described the preferred embodiment of the invention it will be obvious to those skilled in the art that a system has been provided which takes into account the individual marking style of individuals from document to document to identify those target areas which have been marked and to distinguish them from erasures or other interfering marks on the document. It will further be evident that revisions and modifications will be obvious to those skilled in the art which will be included within the scope of the following claims.

What is claimed is:

1. An apparatus for reading and analyzing the quality of marks on a document to distinguish between intended marks and other marks comprising means for locating and tracking marks on the document, means for comparing the mark locations and number of marks with known parameter data, means for analyzing the quality of any mark at a known mark location, and assigning a quality factor to the mark, means for storing the quality factor assigned to each mark, and means for analyzing the quality factor for all the marks on a given document to determine which marks found are intended marks.

2. The apparatus according to claim 1 wherein said means for analyzing the quality of a mark includes means for dividing each mark into a plurality of cells, means for assigning a value represented by that cell and means for summing the values assigned to each cell to produce a quality factor for each mark.

* * * * *